United States Patent
Li et al.

(10) Patent No.: US 11,174,324 B2
(45) Date of Patent: Nov. 16, 2021

(54) MANUFACTURE OF HYDROPHOBIZED NANOCELLULOSE INTERMEDIATE AS WELL AS HYDROPHOBIZED NANOCELLULOSE

(71) Applicant: FINECELL SWEDEN AB, Bromma (SE)

(72) Inventors: Dongfang Li, Bromma (SE); Jonatan Henschen, Stockholm (SE); Monica Ek, Hägersten (SE)

(73) Assignee: FINECELL SWEDEN AB, Bromma (SE)

( * ) Notice: Subject to any disclaimer, the term of this patent is extended or adjusted under 35 U.S.C. 154(b) by 0 days.

(21) Appl. No.: 16/621,833

(22) PCT Filed: Jun. 18, 2018

(86) PCT No.: PCT/SE2018/050637
§ 371 (c)(1),
(2) Date: Dec. 12, 2019

(87) PCT Pub. No.: WO2018/231143
PCT Pub. Date: Dec. 20, 2018

(65) Prior Publication Data
US 2020/0157250 A1 May 21, 2020

(30) Foreign Application Priority Data
Jun. 16, 2017 (SE) .................... 1750767-4

(51) Int. Cl.
*C08B 15/02* (2006.01)
*C08B 3/12* (2006.01)
*C08B 3/22* (2006.01)
*B82Y 40/00* (2011.01)

(52) U.S. Cl.
CPC .............. *C08B 15/02* (2013.01); *C08B 3/12* (2013.01); *C08B 3/22* (2013.01); *B82Y 40/00* (2013.01)

(58) Field of Classification Search
CPC .............. C08B 15/02; C08B 3/12; C08B 3/22
See application file for complete search history.

(56) References Cited

U.S. PATENT DOCUMENTS

2009/0111980 A1  4/2009  Fredrik et al.

FOREIGN PATENT DOCUMENTS

WO  2014049208  4/2014

OTHER PUBLICATIONS

Ma et al., Atmospheric Environment, 2013, 69, p. 281-288. (Year: 2013).*
Gardea-Hernandez et al., "Fast wood fiber esterification. I. Reaction with oxalic acid and cetyl alcohol", Carbohydrate Polymers, Applied Science Publishers, Ltd. Barking, GB, (Oct. 31, 2007), vol. 71, No. 1, doi:10.1016/J.CARBPOL.2007.05.014, ISSN 0144-8617, pp. 1-8, XP022323298 DOI: http://dx.doi.org/10.1016/j.carbpol.2007.05.014.
Lonnberg, Hanna, et al. "Surface grafting of microfibrillated cellulose with poly (ε-caprolactone)—Synthesis and characterization." European Polymer Journal 44.9 (2008): 2991-2997.; whole document; pp. 2992-2993; Scheme 1.
IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M.Nie, J. Jirat, B. Kosata; updates compiled by A. Jenkins.ISBN 0-9678550-9-8. https://doi.org/10.1351/goldbook.; whole document.
Sirvio, Juho Antti, Miikka Visanko, and Henrikki Liimatainen. "Acidic deep eutectic solvents as hydrolytic media for cellulose nanocrystal production." Biomacromolecules 17.9 (2016): 3025-3032.
De Menezes, Aparecido Junior, et al. "Extrusion and characterization of functionalized cellulose whiskers reinforced polyethylene nanocomposites." Polymer 50.19 (2009): 4552-4563.
Dankovich, T.A.; Hsieh, Y-L.; 2007, "Surface modification of cellulose with plant triglycerides for hydrophobicity", Cellulose, vol. 14, DOI:doi:10.1007/s10570-007-9132-1, pp. 469-480, XP019524878.
Sigma-Aldrich—Product Specification No. 247537 "Oxalic acid dihydrate", ACS reagent, ≥99% https://www.sigmaaldrich.com/catalog/product/sial/247537?lang=en&region=US.
Chen, Liheng, et al. "Highly thermal-stable and functional cellulose nanocrystals and nanofibrils produced using fully recyclable organic acids." Green Chemistry 18.13 (2016): 3835-3843.

* cited by examiner

*Primary Examiner* — Jonathan S Lau
(74) *Attorney, Agent, or Firm* — Gabriela B. Tomescu, Esq.; Bergenstråhle & Partners AB

(57) ABSTRACT

The present invention relates to a method for manufacturing hydrophobized nanocellulose comprising the steps of: a) providing a cellulose-containing material wherein the cellulose-containing material contains less than 20 wt. % water, b) contacting the cellulose-containing material with oxalic acid dihydrate, and heating above the melting point of the oxalic acid dihydrate, to obtain cellulose oxalates, c) washing the mixture, d) preparing a suspension comprising the material from step c) and e) recovering hydrophobized nanocellulose from the suspension. The present invention relates also to a method of manufacturing hydrophobized nanocellulose intermediate which comprises the above described steps a)-c). The methods disclosed in the present invention are quick, inexpensive, simple, and direct. Pulp can be used as raw material.

25 Claims, 4 Drawing Sheets

MANUFACTURE OF HYDROPHOBIZED NANOCELLULOSE INTERMEDIATE AS WELL AS HYDROPHOBIZED NANOCELLULOSE

CROSS-REFERENCE TO RELATED APPLICATIONS

This application is a § 371 national stage entry of International Application No. PCT/SE2018/050637, filed Jun. 18, 2018, which claims priority of Sweden National Application No. 1750767-4 filed Jun. 16, 2017, the entire contents of which are incorporated herein by reference.

TECHNICAL FIELD

The present invention relates to hydrophobized nanocellulose intermediate as well as a method for manufacturing said hydrophobized cellulose powder. Moreover, the present invention also relates to hydrophobized nanocellulose as well as methods for manufacturing hydrophobized nanocellulose

BACKGROUND OF THE INVENTION

There is an increasing demand for strong and lightweight composites across many industrial applications around the world, such as construction, packaging, automotive engineering, and aerospace engineering. On the other hand, due to environmental concerns and requirements for sustainable development, such materials are preferably developed from renewable and non-petroleum based resources. The remarkable mechanical properties, low density, high aspect ratio, nano-sized dimensions, and the bio-based origin of nanocellulose (NC) open a great opportunity to use it as reinforcement fillers in composite materials.

The major role that nanocellulose plays in reinforcement in composites is load-bearing. A good dispersability of nanocellulose in the polymer matrices provided by a homogenous mixing (e.g. melt extrusion) as well as a good interfacial affinity between them are crucial in the improvement of the overall mechanical properties of the composites, as they determine if the mechanical stress/load from the external resources can be uniformly and efficiently transferred from the matrices to the nanocellulose.

However, it remains challenging to homogeneously disperse nanocellulose in low- or non-polar or hydrophobic polymer matrices. Nanocellulose possesses abundant hydroxyl groups on its surface, which makes it incompatible with these polymer matrices and it tends to aggregate. The incompatibility results in weak bonding between nanocellulose and polymer chains in the matrices, while the aggregation of nanocellulose leads to a decrease in bondable area. These effects make it difficult to effectively transfer the stress/load from polymer chains to nanocellulose and consequently the reinforcement is much less efficient. Hence, there is a need for developing methods for improving the dispersion of nanocellulose in low- or non-polar or hydrophobic matrices.

A further challenge is dispersing nanocellulose having carboxyl groups (—COOH) such as oxalate groups in low- or non-polar or hydrophobic matrices. Examples of nanocellulose having such carboxyl groups is disclosed in PCT/SE2016/051280 (which was not published at the application date of the present application) which relates to nanocellulose and nanocellulose intermediates which comprise oxalate moieties. However, PCT/SE2016/051280 is silent about methods of dispersing said nanocellulose and nanocellulose intermediates in low- or non-polar or hydrophobic matrices. Hence, there is a need for developing methods for improving the dispersion of nanocellulose and nanocellulose intermediates having oxalate groups in low- or non-polar or hydrophobic matrices.

SUMMARY OF THE INVENTION

The nanocellulose intermediate resulting in the methods disclosed in PCT/SE2016/051280 has carboxyl groups on its surface and thus can dissociate protons when it is dispersed in liquid media. The nanocellulose intermediate is in the form of a powder and may also be referred to as a cellulose oxalate. In the present invention, the nanocellulose intermediate is dispersed in either oil or lactone and then heated at elevated temperatures for certain period of times. The dissociated protons may catalyze transesterification reactions between the hydroxyl groups of the nanocellulose intermediate and the ester bonds in the oil or lactone, which consequently results in grafting of long alkyl groups on the surface of the nanocellulose intermediate. Consequently, the nanocellulose intermediate becomes more hydrophobic.

In preferred embodiments of the invention plant triglycerides, such as vegetable oils, are used as reagents for hydrophobizing nanocellulose intermediate since these oils are cheap as well as being bulk chemicals from renewable resources. Many of the existing technologies involve the use of chemicals from nonrenewable resources or toxic chemicals for such purpose.

In other preferred embodiments of the present invention, lactones, such as caprolactone (ε-caprolactone), are used as reagents for the hydrophobizing nanocellulose intermediate. Although it is derived from fossil-resources, polymerized ε-caprolactone, or polycaprolactone is a biodegradable polymer. Due to its good biocompatibility, materials made up of polycaprolactone have been used for medical applications.

No solvent exchange or other pretreatments are needed in the present invention. Due to the unique properties of the nanocellulose intermediate (i.e. cellulose oxalate) disclosed in PCT/SE2016/051280, the present invention can be easily done by first mixing said nanocellulose intermediate (which is in dry powder form) in liquid chemicals and then heating the mixture. The reaction is solvent-free and the excess oils can be recovered and reused.

In the present invention, the nanocellulose intermediate (i.e. cellulose oxalate) powder is able to provide protons as catalysts for the chemical reactions (i.e. grafting of alkyl groups on the surface of nanocellulose intermediate), and therefore no additional catalysts are needed for the chemical reaction whereas such catalysts are often needed in most of the existing technology.

It is an object of the present invention to obviate at least some of the disadvantages in the prior art and provide an improved method for manufacturing hydrophobized nanocellulose intermediate as well as hydrophobized nanocellulose In a first aspect there is provided a method for manufacturing hydrophobized nanocellulose, said method comprising the steps of:
a) providing a cellulose-containing material wherein the cellulose-containing material contains less than 20 wt. % water, preferably less than 10 wt. % water,
b) contacting the cellulose-containing material with oxalic acid dihydrate, and heating above the melting point of the oxalic acid dihydrate, to obtain cellulose oxalates, c) washing, filtering and/or centrifuging the mixture resulting from step b),
d) grafting of alkyl groups on the surface of nanocellulose intermediate resulting from step c),
e) preparing a suspension comprising the washed material from step d), and
f) recovering nanocellulose from the suspension,
wherein said nanocellulose is nanocrystalline cellulose and/or nanofibrillated cellulose.

In a second aspect of the invention there is provided a composition comprising nanocellulose manufactured according to the method disclosed in the first aspect of the invention.

In a third aspect of the invention there is provided a use of a composition comprising nanocellulose according to the second aspect of the invention in at least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a fourth aspect there is provided a method for manufacturing nanocellulose intermediate, said method comprising the steps of:
a. providing a cellulose-containing material wherein the cellulose-containing material contains less than 20 wt. % water, preferably less than 10 wt. % water,
b. contacting the cellulose-containing material with oxalic acid dihydrate, and heating above the melting point of the oxalic acid dihydrate, to obtain cellulose oxalates,
c. washing, filtering and/or centrifuging the mixture resulting from step b),
wherein said nanocellulose intermediate is a nanocrystalline cellulose intermediate or nanofibrillated cellulose intermediate.

In a fifth aspect of the invention there is provided a composition comprising nanocrystalline cellulose intermediate manufactured according to the method disclosed in the fourth aspect of the invention.

In a sixth aspect of the invention there is provided a use of a composition comprising nanocellulose intermediate according to the fifth aspect of the invention in at least one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

Further aspects and embodiments are defined in the appended claims, which are specifically incorporated herein by reference.

BRIEF DESCRIPTION OF THE DRAWINGS

The invention is now described, by way of example, with reference to the accompanying drawings, in which.

DETAILED DESCRIPTION

Figure 1:
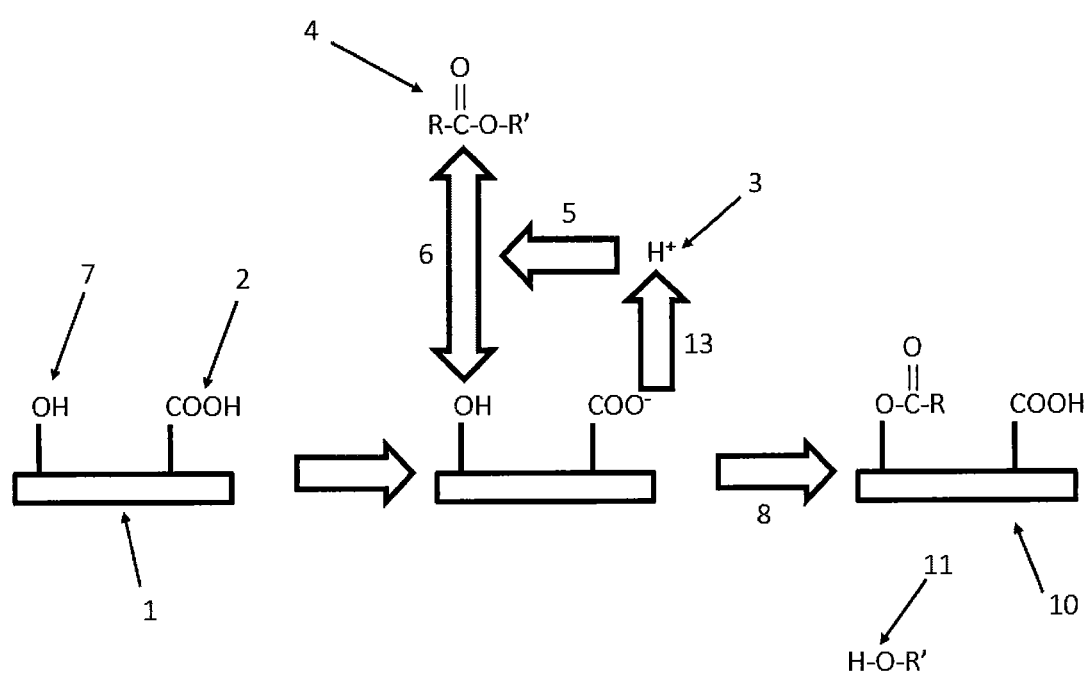
FIG. 1 illustrates the method for manufacturing hydrophobized nanocellulose intermediate.

The present invention is summarized in FIG. 1 which illustrates the method for manufacturing hydrophobized nanocellulose intermediate such as the nanocellulose intermediate (1) manufactured in PCT/SE2016/051280. The nanocellulose intermediate is in the form of a powder and may also be referred to as a cellulose oxalate. The surface of the nanocellulose intermediate (1) comprises hydroxyl (—OH) and carboxyl groups (—COOH) wherein said carboxyl groups are part of the oxalate moieties. The nanocellulose intermediate has carboxyl groups (2) on its surface and thus can dissociate (13) protons (3) when it is dispersed in liquid media such as oil (4) or lactone (4). The oil (4) or lactone (4) comprise alkyl chains (R) and (—R') wherein each alkyl chain may be straight, branched or cyclic (i.e. cycloalkyl). The alkyl chains (—R) and (—R') may each comprise one or more double bonds (in either cis or trans configuration) or triple bonds, and moreover, the alkyl chains (—R) and (—R') may be substituted. The —R alkyl chain may comprise 1-22 carbon atoms such as 1-5 carbon atoms (short chain), 6 to 12 carbon atoms (medium-chain), 13 to 21 carbon atoms (long-chain), or 22 or more carbon atoms (very long-chain).

In the present invention, the nanocellulose intermediate (1) is dispersed in either oil (4) or lactone (4) and then heated at elevated temperatures at certain time periods. The dissociated protons (3) may catalyze (5) transesterification reactions (6) between the hydroxyl groups (7) of the nanocellulose intermediate and the ester bonds of the oil (4) or lactone (4), which consequently results in grafting (8) of alkyl groups (—R) on the surface of the nanocellulose intermediate. Consequently, hydrophobized nanocellulose intermediate (10) is produced as a main product and H—O—R' (11) is produced as a byproduct.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

Nanocrystalline cellulose (NCC) as used throughout the description and the claims denotes cellulose in crystalline form or at least in essentially or mostly crystalline form, since less-ordered forms also exist in most NCCs. NCCs are rigid rodlike crystals with diameter in the range of 5-40 nm and lengths of typically a few hundred nanometers, in the range of 100-600 nm. (Osong S. H., Norgren S. and Engstrand P. 2016. Processing of wood-based microfibrillated cellulose and nanofibrillated cellulose, and applications relating to papermaking: a review. Cellulose 23: 93-123)

Nanofibrillated cellulose (NFC) or microfibrillated cellulose (MFC) as used throughout the description and the claims denotes cellulose containing both crystalline and less-ordered forms. NFCs or MFCs have diameters in the range of 5-100 nm and lengths of >600 nm to several µm. (Osong S. H., Norgren S. and Engstrand P. 2015. Processing of wood-based microfibrillated cellulose and nanofibrillated cellulose, and applications relating to papermaking: a review. Cellulose 23: 93-123; Nelson K., Retsina T., Iakovlev M., van Heiningen A., Deng Y., Shatkin J. A. and Mulyadi. 2016. Chapter 9. American Process: production of low cost nanocellulose for renewable, advanced materials applications. In *Materials Research for Manufacturing*. Eds. Madsen L. D. and Svedberg E. B. Springer International Publishing, Switzerland. pp. 267-302)

Cellulose-containing material is material comprising cellulose. Examples include but are not limited to wood pulp, non-wood pulp, cotton, and bacterial cellulose. It encompasses wood pulps as well as commercial microcrystalline cellulose produced from cotton linter.

Oxalic acid dihydrate (OAD) has a relatively low melting point of 104-106° C., which makes it possible to mix the molten OAD with pulp (cellulose-containing material) to carry out the esterification of cellulose.

A nanocellulose intermediate is a precursor of nanocellulose. A nanocrystalline cellulose intermediate is a precursor of nanocrystalline cellulose. A nanofibrillated cellulose intermediate is a precursor of nanofibrillated cellulose. The nanocellulose, nanocrystalline cellulose and nanofibrillated cellulose intermediates are produced in step c), i.e. when washing the mixture resulting from step b). The nanocellulose intermediate may also be referred to as cellulose oxalate. The nanocellulose intermediate is recovered as a dry powder in step c) in the preferred embodiments of the invention.

In a first aspect there is provided a method for manufacturing hydrophobized nanocellulose, said method comprising the steps of:
a) providing a cellulose-containing material wherein the cellulose-containing material contains less than 20 wt. % water, preferably less than 10 wt. % water,
b) contacting the cellulose-containing material with oxalic acid dihydrate, and heating above the melting point of the oxalic acid dihydrate, to obtain cellulose oxalates,
c) washing the mixture resulting from step b),
d) grafting of alkyl groups on the surface of nanocellulose intermediate resulting from step c),
e) preparing a suspension comprising the washed material from step d), and
f) recovering nanocellulose from the suspension,
wherein said nanocellulose is nanocrystalline cellulose and/or nanofibrillated cellulose.

In one embodiment the dry weight ratio between cellulose-containing material and oxalic acid dihydrate is 1:1 to 1:100, preferably 1:1 to 1:50, more preferably 1:1 to 1:10, most preferably 1:2.3 to 1:3.9.

In one embodiment oxalic acid dihydrate has a purity of 95-100 wt. %, preferably ≥99 wt. %.

In one embodiment the reaction in step b) is solvent-free.

In one embodiment the cellulose-containing material provided in step a) comprises at least 80 wt. % cellulose, preferably at least 90 wt. %. In one embodiment the cellulose-containing material provided in step a) is bleached.

In one embodiment the cellulose-containing material and the oxalic acid dihydrate are heated above 106° C., preferably above 110° C. in step b). In one embodiment the cellulose-containing material and the oxalic acid dihydrate are heated to a temperature in the interval 104-106° C. (approximate melting point of oxalic acid dihydrate), in other embodiments other intervals for the temperature are used including 105-107° C., 104-108° C., 105-110° C., 105-111° C., 104-111° C., and 104-112° C. In one embodiment the temperature in step b) does not exceed 120° C. The temperature should not be too high, otherwise the material will become dark during the reaction with oxalic acid dihydrate. The material becomes less useful when it becomes dark. Darkening can both occur at too high temperatures, typically above 120° C. and during extended treatment times, typically in excess of 120 minutes.

In one embodiment the cellulose-containing material and the oxalic acid dihydrate are mixed during step b). In one embodiment step b) is carried out in an extruder, a thermostatic reaction vessel, or a sealed pressure vessel.

In one embodiment the cellulose-containing material and the oxalic acid dihydrate are heated above the melting point of the oxalic acid dihydrate for a time in the interval 5-120 minutes, preferably 30-60 minutes.

In one embodiment the cellulose-containing material is not contacted with a deep eutectic solvent(s)

In one embodiment the mixture is washed in step c) with at least one selected from the group consisting of ethanol, acetone, water, and THF. In an alternative embodiment the mixture is washed in step c) with at least one selected from the group consisting of water, ethanol, acetone, THF, and ethyl acetate. In yet another embodiment the mixture is washed in step c) with at least one solvent which is capable of dissolving oxalic acid dihydrate.

In one embodiment the grafting in step d) is carried out by dispersing the nanocellulose intermediate in at least one oil or lactone. The oil may be animal, plant and/or petrochemical in origin.

In one embodiment said oil comprises organic oil and/or mineral oil.

In one embodiment said oil comprises vegetable oil, preferably edible oil or cooking oil.

In one embodiment said oil comprises rapeseed oil, sunflower oil, palm oil, canola oil, soybean oil, safflower oil, coconut oil, olive oil, avocado oil, corn oil, cottonseed oil, flaxseed oil, linseed oil, palm oil, peanut oil, poppy seed oil, almond oil and/or sesame seed oil, beech nut oil, brazil nut oil, cashew oil, hazelnut oil, macadamia oil, mongongo nut oil, pecan oil, pine nut oil, pistachio oil, walnut oil, grapefruit seed oil, lemon oil, orange oil, gourd oil (such as from the seeds of *Momordica charantia, Lagenaria siceraria* or *Cucurbita foetidissima*) butternut squash seed oil, egusi seed oil, pumpkin seed oil, watermelon seed oil, açaí oil, black seed oil, blackcurrant seed oil, borage seed oil, evening primrose oil, amaranth oil, apricot oil, apple seed oil, argan oil, babassu oil, ben oil, borneo tallow nut oil, cape chestnut oil, carob pod oil, cocoa butter, cocklebur oil, cohune oil, coriander seed oil, date seed oil, dika oil, false flax oil, hemp oil, kapok seed oil, kenaf seed oil, *lallemantia* oil, mafura oil, marula oil, meadowfoam seed oil, mustard oil, niger seed oil, nutmeg butter, okra seed oil, *papaya* seed oil, *perilla* seed oil, persimmon seed oil, pequi oil, pili nut oil, pomegranate seed oil, poppyseed oil, pracaxi oil, prune kernel oil, *quinoa* oil, ramtil oil, rice bran oil, royle oil, sacha inchi oil, sapote oil, seje oil, shea butter, taramira oil, tea seed oil, thistle oil, tigernut oil, tobacco seed oil, tomato seed oil and/or wheat germ oil.

In one embodiment said oil comprises glycerides (such as monoglycerides, diglycerides and triglycerides), free fatty acids and/or conjugated fatty acids such as fatty acid esters. Some examples of triglycerides are tri esters of glycerol and fatty acids such as oleic acid, linoleic acid, linolenic acid, erucic acid, ricinoleic acid, petroselinic acid, calendic acid, α-eleostearic acid, santalbic acid, and vernolic acid. Some examples of fatty acids are oleic acid, linoleic acid, linolenic acid, erucic acid, ricinoleic acid, petroselinic acid, calendic acid, α-eleostearic acid, santalbic acid, and vernolic acid.

In one embodiment said lactone is caprolactone (ε-caprolactone) and/or cyclic esters of hydroxycarboxylic acids such as β-propiolactone, γ-butyrolactone, and lactide/cyclic ester of lactic acid.

In one embodiment the material from step e) is mixed with a liquid (such as water, organic solvents, polymer melts, paint formulations, composite formulations, and cosmetic formulations) to obtain a suspension.

In one embodiment the aqueous suspension is prepared at a pH in the interval 9-10 in step e).

In one embodiment the suspension is prepared using at least one selected from the group consisting of sonication, micro-fluidization, and mechanical disintegration. It has been found that the use of sonication and micro-fluidization increase the yield of the process.

In one embodiment nanocellulose in step f) is recovered from the suspension after centrifugation. The suspension is centrifuged and the nanocellulose will remain in suspension whereas other parts will sediment.

Recovering nanocellulose in step f) in the above disclosed aspects and embodiments is done by preparing a suspension of nanocellulose, a mixture containing nanocellulose or a dry material containing nanocellulose. Thus, recovering nanocrystalline cellulose and/or nanofibrillated cellulose in step e) is done by preparing a suspension of nanocrystalline cellulose and/or nanofibrillated cellulose, a mixture containing nanocrystalline cellulose and/or nanofibrillated cellulose, or a dry material containing nanocrystalline cellulose and/or nanofibrillated cellulose.

In a second aspect of the invention a composition comprising nanocellulose is manufactured according to the method disclosed in the first aspect and embodiments thereof.

In a third aspect of the invention the composition comprising nanocellulose of the second aspect of the invention is used in at least one: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery.

In a fourth aspect there is provided a method for manufacturing hydrophobized nanocellulose intermediate, said method comprising the steps of:
  a. providing a cellulose-containing material wherein the cellulose-containing material contains less than 20 wt. % water, preferably less than 10 wt. % water,
  b. contacting the cellulose-containing material with oxalic acid dihydrate, and heating above the melting point of the oxalic acid dihydrate, to obtain cellulose oxalates,
  c. washing the mixture resulting from step b),
  d. grafting of alkyl groups on the surface of nanocellulose intermediate resulting from step c),
  wherein said nanocellulose intermediate is a nanocrystalline cellulose intermediate and/or nanofibrillated cellulose intermediate.

In one embodiment the cellulose-containing material provided in step a) comprises at least 80 wt. % cellulose, preferably at least 90 wt. %.

In one embodiment the cellulose-containing material provided in step a) is bleached.

In one embodiment the dry weight ratio between cellulose-containing material and oxalic acid dihydrate is 1:1 to 1:100, preferably 1:1 to 1:50, more preferably 1:1 to 1:10, most preferably 1:2.3 to 1:3.9.

In one embodiment oxalic acid dihydrate has a purity of 95-100 wt. %, preferably ≥99 wt. %.

In one embodiment the reaction in step b) is solvent-free.

In one embodiment the cellulose-containing material and the oxalic acid dihydrate are heated above 106° C., in step b).

In one embodiment the cellulose-containing material and the oxalic acid dihydrate are heated above 110° C., in step b).

In one embodiment the temperature in step b) does not exceed 120° C.

In one embodiment the cellulose-containing material and the oxalic acid dihydrate are mixed during step b).

In one embodiment step b) is carried out in an extruder, or a thermostatic reaction vessel, or a sealed pressure vessel.

In one embodiment the cellulose-containing material and the oxalic acid dihydrate are heated above the melting point of the oxalic acid dihydrate for a time in the interval 5-120 minutes, preferably 30-60 minutes.

In one embodiment the cellulose-containing material is not contacted with a deep eutectic solvent(s)

In one embodiment the mixture is washed in step c) with at least one solvent capable of dissolving oxalic acid dihydrate.

In one embodiment the mixture is washed in step c) with at least one selected from the group consisting of ethanol, acetone, water, and THF.

In one embodiment the grafting in step d) is carried out by dispersing the nanocellulose intermediate in at least one oil or lactone. The oil may be animal, plant and/or petrochemical in origin.

In one embodiment said oil comprises organic oil and/or mineral oil.

In one embodiment said oil comprises vegetable oil, preferably edible oil or cooking oil.

In one embodiment said oil comprises rapeseed oil, sunflower oil, palm oil, canola oil, soybean oil, safflower oil, coconut oil, olive oil, avocado oil, corn oil, cottonseed oil, flaxseed oil, linseed oil, palm oil, peanut oil, poppy seed oil, almond oil and/or sesame seed oil, beech nut oil, brazil nut oil, cashew oil, hazelnut oil, macadamia oil, mongongo nut oil, pecan oil, pine nut oil, pistachio oil, walnut oil, grapefruit seed oil, lemon oil, orange oil, gourd oil (such as from the seeds of *Momordica charantia, Lagenaria siceraria* or *Cucurbita foetidissima*) butternut squash seed oil, egusi seed oil, pumpkin seed oil, watermelon seed oil, açaí oil, black seed oil, blackcurrant seed oil, borage seed oil, evening primrose oil, amaranth oil, apricot oil, apple seed oil, argan oil, babassu oil, ben oil, borneo tallow nut oil, cape chestnut oil, carob pod oil, cocoa butter, cocklebur oil, cohune oil, coriander seed oil, date seed oil, dika oil, false flax oil, hemp oil, kapok seed oil, kenaf seed oil, *lallemantia* oil, mafura oil, marula oil, meadowfoam seed oil, mustard oil, niger seed oil, nutmeg butter, okra seed oil, *papaya* seed oil, *perilla* seed oil, persimmon seed oil, pequi oil, pili nut oil, pomegranate seed oil, poppyseed oil, pracaxi oil, prune kernel oil, *quinoa* oil, ramtil oil, rice bran oil, royle oil, sacha inchi oil, sapote oil, seje oil, shea butter, taramira oil, tea seed oil, thistle oil, tigernut oil, tobacco seed oil, tomato seed oil and/or wheat germ oil.

In one embodiment said oil comprises glycerides (such as monoglycerides, diglycerides and triglycerides), free fatty acids and/or conjugated fatty acids such as fatty acid esters. Some examples of triglycerides are tri esters of glycerol and fatty acids such as oleic acid, linoleic acid, linolenic acid, erucic acid, ricinoleic acid, petroselinic acid, calendic acid, α-eleostearic acid, santalbic acid, and vernolic acid. Some examples of fatty acids are oleic acid, linoleic acid, linolenic acid, erucic acid, ricinoleic acid, petroselinic acid, calendic acid, α-eleostearic acid, santalbic acid, and vernolic acid.

In one embodiment said lactone is caprolactone (ε-caprolactone) and/or cyclic esters of hydroxycarboxylic acids such as β-propiolactone, γ-butyrolactone, and lactide/cyclic ester of lactic acid.

In a fifth aspect of the invention there is provided a composition comprising nanocellulose intermediate manufactured according to the fourth aspect of the invention.

In a sixth aspect of the invention the composition comprising nanocellulose intermediate according to the fifth aspect of the invention is used at least in one of: automotive bio-based composites such as fiberglass replacement for structural and non-structural uses, cement additives, wet-strength additives, dry-strength additives, wet-end additives such as wet-end additives in packaging coatings and films, transparent films for food packaging, polymer composite additives in composites, paper, electronic packaging, pharmaceutical excipients such as fillers, paper composites with superior strength properties, hygiene and absorbent products, mechanically enhanced spun fibers and textiles, cosmetic excipients such as filler, food additives, insulation for buildings such as sound and/or heat barriers, aerospace composites, aerogels for oil and gas, pigments such as architectural pigments, coatings, hydrophobic and self-cleaning coatings, paints, dispersants, viscosity modulators, building materials such as structural composites, switchable optical devices, bone replacement, tooth repair medical composites, strain sensors, filters such as filtration of water and air, flexible displays, OLED displays, flexible circuits, printable electronics, conductive substrates, solar panels such as flexible solar panels, smart packaging, photonics, and drug delivery All the described alternative embodiments above or parts of an embodiment can be freely combined without departing from the inventive idea as long as the combination is not contradictory.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

EXPERIMENTAL

All percentages and ratios are calculated by weight unless clearly indicated otherwise.

Materials. Commercially available softwood dissolving pulp (cellulose content 96%), hardwood dissolving pulp (cellulose content 97%), microcrystalline cellulose (Avicel PH-101, cellulose content 100%), and bleached softwood kraft pulp (cellulose content>80%) were used as cellulose raw material. Each dried pulp was manually torn to smaller pieces (around 2×2 $cm^2$). Oxalic acid dihydrate (≥99%), tetrahydrofuran (THF, ≥99.99%), acetone (≥99%), and ethanol (≥95%) were commercially available.

Esterification of cellulose by oxalic acid dihydrate. Each pulp was mixed with oxalic acid dihydrate according to the dry weight ratios of 1/2.3 or 1/3.9. Each mixture was heated at 110° C. for 30 min, 35 min, or 60 min under constant mixing, to obtain cellulose oxalates (see all examples in Tables 1 and 2). After the reaction, each mixture was washed by THF, ethanol, or acetone to remove the excess oxalic acid dihydrate and then Soxhlet extracted by THF or ethanol for 20 h, or washed excessively by filtration of ethanol or acetone until the conductivity of filtrate was below 2 μS $cm^{-1}$. Then all samples were dried either in fume hood or at 50° C. in an oven. The product is nanocellulose intermediate (Example 20) which may also be referred to as cellulose oxalate.

Grafting of alkyl groups on the surface of nanocellulose intermediate (i.e. hydrophobization of nanocellulose intermediate). A mixture of nanocellulose intermediate (i.e. cellulose oxalate) and hydrophobization reagent with a weight ratio ranging from 1/18 to 1/50 was heated at 110° C. under constant mixing for different periods of time, ranging from 1 h to 24 h (Table 1). The reaction was terminated by removing the heat, followed by filtration to remove the excess hydrophobization reagent, which could be reused. Each hydrophobized nanocellulose intermediate was washed excessively by acetone through filtration or centrifugation, and then dried under vacuum conditions at room temperature.

The nanocellulose intermediate (i.e. cellulose oxalate) version of Example 20 from PCT/SE2016/051280 was grafted according to the method in the previous paragraph. The resulting hydrophobized nanocellulose intermediates are shown in Table 1. [The nanocellulose intermediate version of Example 20 from PCT/SE2016/051280 is made from commercially available softwood dissolving pulp as described in paragraph 82. The resulting product is esterified as described in paragraph 83].

TABLE 1

Summary of examples of hydrophobization of cellulose oxalates.

| Example | Hydrophobization reagent | Weight ratio of raw material/ hydrophobization reagent | Reaction condition |
|---|---|---|---|
| 24 | ε-Caprolactone | 1/50 | 1 h, 110° C. |
| 25 | ε-Caprolactone | 1/50 | 2 h, 110° C. |
| 26 | ε-Caprolactone | 1/50 | 3 h, 110° C. |
| 27 | ε-Caprolactone | 1/50 | 4 h, 110° C. |
| 28 | ε-Caprolactone | 1/50 | 6 h, 110° C. |
| 29 | ε-Caprolactone | 1/50 | 8 h, 110° C. |
| 30 | ε-Caprolactone | 1/50 | 10 h, 110° C. |
| 31 | ε-Caprolactone | 1/50 | 16 h, 110° C. |
| 32 | ε-Caprolactone | 1/50 | 20 h, 110° C. |
| 33 | ε-Caprolactone | 1/50 | 24 h, 110° C. |
| 34 | Vegetable oil 1[a] | 1/45 | 24 h, 110° C. |
| 35 | Vegetable oil 2[b] | 1/18 | 24 h, 110° C. |
| 36 | Vegetable oil 2[b] | 1/45 | 24 h, 110° C. |

[a]Vegetable oil 1: rapeseed oil.
[b]Vegetable oil 2: a mixture of rapeseed oil and sunflower oil with a volume ratio of 3/1.

Preparation of hydrophobized nanocellulose suspension. Suspensions of hydrophobized nanocellulose intermediate (i.e. hydrophobized cellulose oxalates) were prepared. Each suspension may be sonicated and centrifuged. The supernatant may be collected to obtain a suspension of hydrophobized nanocellulose.

Some of the suspensions of hydrophobized nanocellulose intermediate (hydrophobized cellulose oxalates) were homogenized in a micro-fluidizer to obtain suspensions of nanocellulose.

Results

Figure 2:
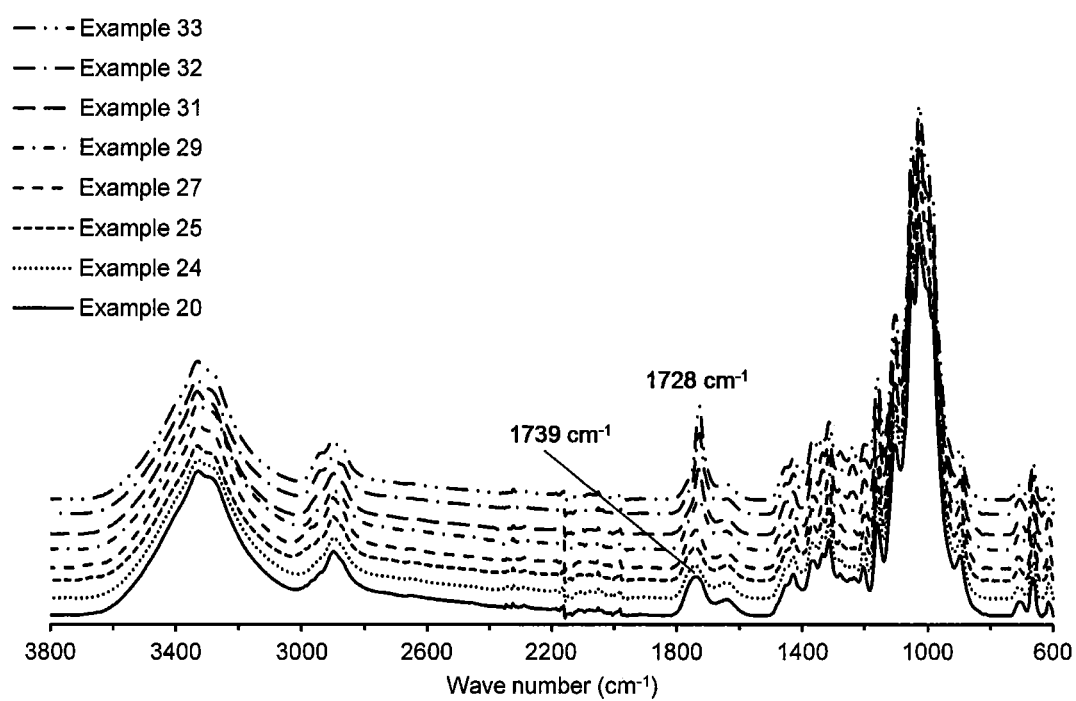
FIG. 2 shows FTIR (Fourier transform infrared spectroscopy) spectra of unmodified nanocellulose intermediate (i.e. cellulose oxalate) version of example 20 in PCT/SE2016/051280 and hydrophobized nanocellulose intermediate (i.e. cellulose oxalates) in examples 24 to 33.

As illustrated in FIG. 2, a visible absorption peak at 1739 $cm^{-1}$ in the spectrum of nanocellulose intermediate (example 20) corresponds to the C=O stretching in the carbonyl groups in the of nanocellulose intermediate (i.e. cellulose oxalate). New peaks at 1728 $cm^{-1}$ were observed in the spectra of examples 24 to 33 (FIG. 2), which shows the C=O stretching in the carbonyl groups in the newly formed ester bonds. This indicates successful grafting of polycaprolactone on the surface of nanocellulose intermediate (i.e. cellulose oxalate) through a ring-opening polymerization of ε-caprolactone with the hydroxyls on the surface of cellulose as initiators, as previously described (Hafrén, J. and Córdova, A. 2005. Macromolecular Rapid Communications 26: 82-86.; Lonnberg, H., Zhou, Q., Brumer III, H., Teeri, T. T., Malmström, E. and Hult, A. 2006. Grafting of cellulose fibers with poly(ε-caprolactone) and poly(L-lactic acid) via ring-opening polymerization. Biomacromolecules 7: 2178-2185), though no addition of catalysts was needed in the current method.

Figure 3:
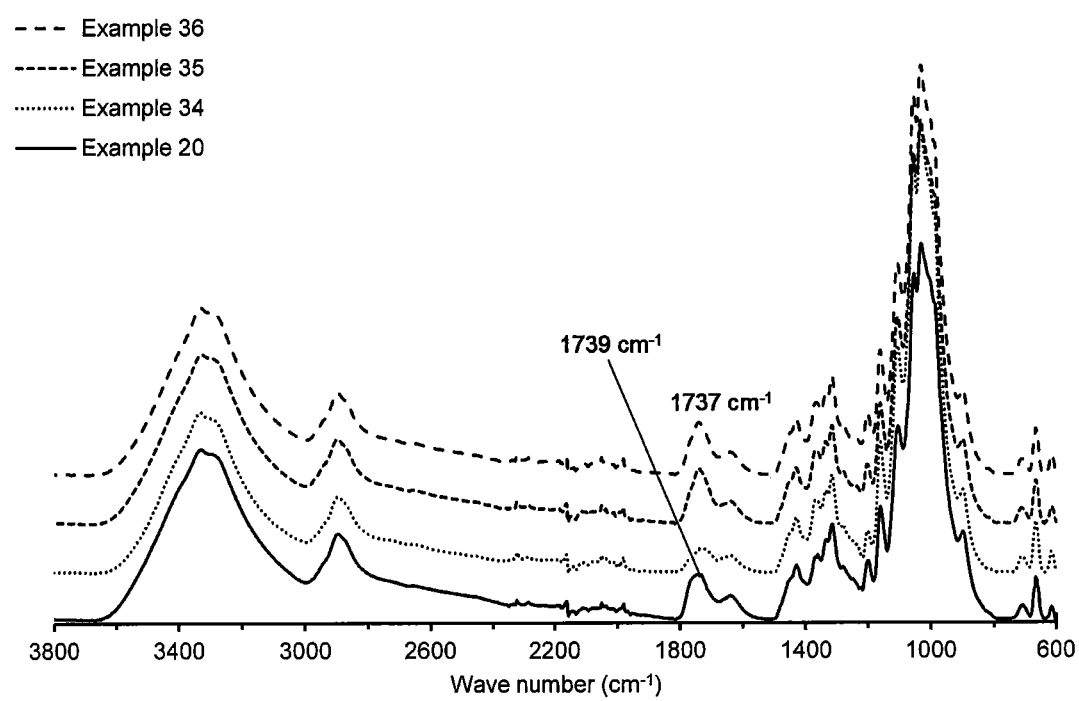
FIG. 3 shows FTIR (Fourier transform infrared spectroscopy) spectra of nanocellulose intermediate (i.e. cellulose oxalate) version of example 20 in PCT/SE2016/051280 and hydrophobized nanocellulose intermediate (i.e. cellulose oxalates) in examples 34 to 36.

For the reaction with vegetable oils, the shape of the band with the peak at 1739 $cm^{-1}$ changed and new peaks at 1737 $cm^{-1}$ were observed, which shows the C=O stretching in the carbonyl groups in the newly formed ester bonds (FIG. 3). This suggests successful grating of fatty acyl groups on the surface of nanocellulose intermediate (i.e. cellulose oxalate) through transesterification between cellulose and triglycerides, as previously described (Dankovich, T. A. and Hsieh, Y-L. 2007. Surface modification of cellulose with plant triglycerides for hydrophobicity. Cellulose 14: 469-480.; Shang, W., Huang, J., Luo, H., Chang, P. R., Feng, J. and Xie, G. 2013. Hydrophobic modification of cellulose nanocrystal via covalently grafting of castor oil. Cellulose 20: 179-190), though neither addition of solvents as liquid media nor addition of catalysts were needed in the current method.

Figure 4:
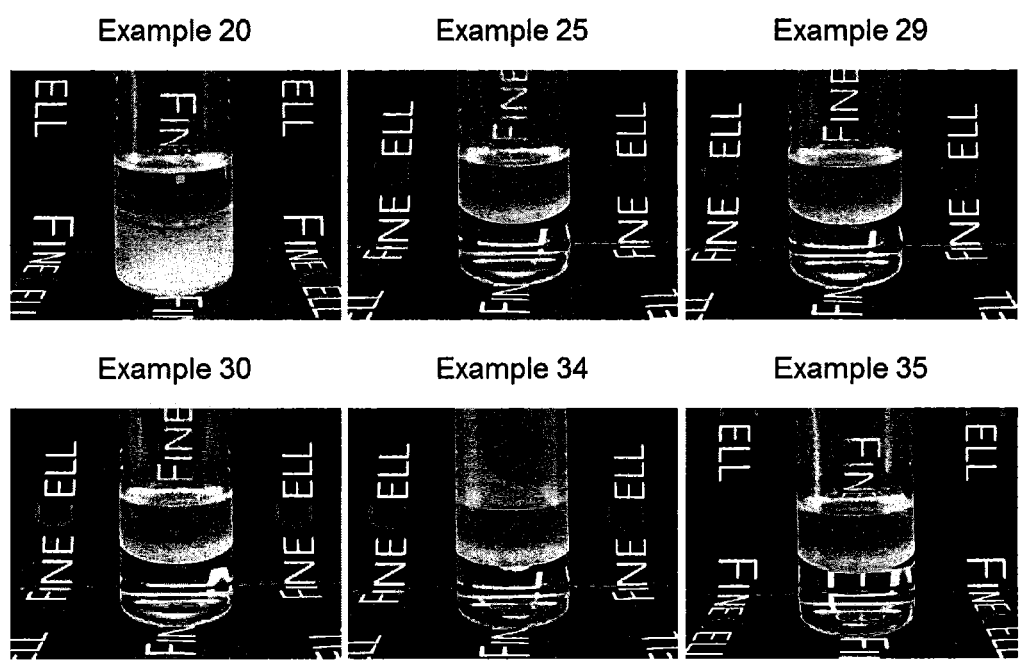
FIG. 4 shows dispersing the unmodified cellulose oxalate (example 20) and modified cellulose oxalates (examples 20, 25, 29, 30, 34, 35) in a system consisting of toluene (upper phase) and water (lower phase) with a volume ratio of 1/1.

When dispersing the unmodified nanocellulose intermediate (i.e. cellulose oxalate) in a system consisting of water and toluene, the nanocellulose intermediate powder stayed in the aqueous phase or at the bottom of the aqueous phase. When dispersing the modified nanocellulose intermediate (i.e. cellulose oxalates) in the same system, the powders stayed in the organic phase or at the interface between the organic phase and aqueous phase (FIG. 4). This observation suggests an improved hydrophobicity of the nanocellulose intermediate (i.e. cellulose oxalate) after the modification with hydrophobization reagents.

The hydrophobized nanocellulose intermediate (i.e. cellulose oxalate) may be fibrillated in low- or non-polar organic solvents or formulations (e.g. paint formulations, cosmetic formulations, and composite formulations/polymer melts) to produce hydrophobic nanocellulose.

The invention claimed is:

1. A method for manufacturing hydrophobized nanocellulose, said method comprising the steps of:
    a. providing a cellulose-containing material wherein the cellulose-containing material contains less than 20 wt. % water,
    b. contacting the cellulose-containing material with oxalic acid dihydrate, and heating above the melting point of the oxalic acid dihydrate, to obtain cellulose oxalates,
    c. washing, filtering and/or centrifuging the mixture resulting from step b),
    d. grafting of alkyl groups on the surface of nanocellulose intermediate resulting from step c), wherein said nanocellulose intermediate is a cellulose oxalate,
    e. preparing a suspension comprising the material from step d), wherein the suspension is prepared using at least one selected from the group consisting of sonication, micro-fluidization, and mechanical disintegration, and
    f. recovering hydrophobized nanocellulose from the suspension,
    wherein said hydrophobized nanocellulose is hydrophobized nanocrystalline cellulose and/or hydrophobized nanofibrillated cellulose,
    wherein the reaction in step b) is solvent-free, and
    wherein cellulose-containing material is not contacted with a deep eutectic solvent.

2. The method according to claim 1, wherein the cellulose-containing material provided in step a) comprises at least 80 wt. % cellulose.

3. The method according to claim 1, wherein the cellulose-containing material provided in step a) is bleached.

4. The method according to claim 1, wherein the dry weight ratio between cellulose-containing material and oxalic acid dihydrate is 1:1 to 1:100.

5. The method according to claim 1, wherein oxalic acid dihydrate has a purity of 95-100 wt. %.

6. The method according to claim 1, wherein the cellulose-containing material and the oxalic acid dihydrate are heated above 106° C., in step b.

7. The method according to claim 1, wherein the cellulose-containing material and the oxalic acid dihydrate are heated above the melting point of the oxalic acid dihydrate for a time in the interval 5-120 minutes.

8. The method according to claim 1, wherein the mixture is washed in step c) with at least one solvent capable of dissolving oxalic acid dihydrate.

9. The method according to claim 1, wherein grafting in step d) is carried out by dispersing the nanocellulose intermediate in at least one oil, wherein said oil comprises alkyl chains (—R) and (—R') wherein each alkyl chain may be straight, branched or cyclic, wherein the alkyl chains (—R) and (—R') may be substituted.

10. The method according to claim 1, wherein said oil comprises rapeseed oil, sunflower oil, palm oil, canola oil, soybean oil, safflower oil, coconut oil, olive oil, avocado oil, corn oil, cottonseed oil, flaxseed oil, linseed oil, palm oil, peanut oil, poppy seed oil, almond oil and/or sesame seed oil, beech nut oil, brazil nut oil, cashew oil, hazelnut oil, macadamia oil, mongongo nut oil, pecan oil, pine nut oil, pistachio oil, walnut oil, grapefruit seed oil, lemon oil, orange oil, gourd oil butternut squash seed oil, egusi seed oil, pumpkin seed oil, watermelon seed oil, açaí oil, black seed oil, blackcurrant seed oil, borage seed oil, evening primrose oil, amaranth oil, apricot oil, apple seed oil, argan oil, babassu oil, ben oil, borneo tallow nut oil, cape chestnut oil, carob pod oil, cocoa butter, cocklebur oil, cohune oil, coriander seed oil, date seed oil, dika oil, false flax oil, hemp oil, kapok seed oil, kenaf seed oil, *lallemantia* oil, mafura oil, macula oil, meadowfoam seed oil, mustard oil, niger seed oil, nutmeg butter, okra seed oil, *papaya* seed oil, *perilla* seed oil, persimmon seed oil, pequi oil, pili nut oil, pomegranate seed oil, poppyseed oil, pracaxi oil, prune kernel oil, *quinoa* oil, ramtil oil, rice bran oil, royle oil, *sacha* inchi oil, sapote oil, *seje* oil, shea butter, taramira oil, tea seed oil, thistle oil, tigernut oil, tobacco seed oil, tomato seed oil and/or wheat germ oil.

11. The method according to claim 1, wherein said oil comprises one or more glyceride, one or more free fatty acid and/or conjugated fatty acid.

12. The method according to claim 1, wherein grafting in step d) is carried out by dispersing the nanocellulose intermediate in at least one oil and then heating the mixture above 100° C. for at least 30.

13. The method according to claim 1, wherein resulting hydrophobized nanocellulose intermediate from step d) is mixed with a liquid to obtain a suspension.

14. A method for manufacturing hydrophobized nanocellulose intermediate, said method comprising the steps of:
a. providing a cellulose-containing material wherein the cellulose-containing material contains less than 20 wt. % water,
b. contacting the cellulose-containing material with oxalic acid dihydrate, and heating above the melting point of the oxalic acid dihydrate, to obtain cellulose oxalates,
c. washing, filtering and/or centrifuging the mixture resulting from step b),
d. grafting of alkyl groups on the surface of nanocellulose intermediate resulting from step c), wherein said nanocellulose intermediate is a cellulose oxalate,
wherein said hydrophobized nanocellulose intermediate is a hydrophobized nanocrystalline cellulose intermediate or hydrophobized nanofibrillated cellulose intermediate,
wherein the reaction in step b) is solvent-free, and
wherein cellulose-containing material is not contacted with a deep eutectic solvent.

15. The method according to claim 14, wherein the cellulose-containing material provided in step a) comprises at least 80 wt. % cellulose.

16. The method according to claim 14, wherein the cellulose-containing material provided in step a) is bleached.

17. The method according to claim 14, wherein the dry weight ratio between cellulose-containing material and oxalic acid dihydrate is 1:1 to 1:100.

18. The method according to claim 14, wherein oxalic acid dihydrate has a purity of 95-100 wt. %.

19. The method according to claim 14, wherein the cellulose-containing material and the oxalic acid dihydrate are heated above 106° C., in step b.

20. The method according to claim 14, wherein the cellulose-containing material and the oxalic acid dihydrate are heated above the melting point of the oxalic acid dihydrate for a time in the interval 5-120 minutes.

21. The method according to claim 14, wherein the mixture is washed in step c) with at least one solvent capable of dissolving oxalic acid dihydrate.

22. The method according to claim 14, wherein grafting in step d) is carried out by dispersing the nanocellulose intermediate in at least one oil, wherein said oil comprises alkyl chains (—R) and (—R') wherein each alkyl chain may be straight, branched or cyclic, wherein the alkyl chains (—R) and (—R') may be substituted.

23. The method according to claim 14, wherein said oil comprises rapeseed oil, sunflower oil, palm oil, canola oil, soybean oil, safflower oil, coconut oil, olive oil, avocado oil, corn oil, cottonseed oil, flaxseed oil, linseed oil, palm oil, peanut oil, poppy seed oil, almond oil and/or sesame seed oil, beech nut oil, brazil nut oil, cashew oil, hazelnut oil, macadamia oil, mongongo nut oil, pecan oil, pine nut oil, pistachio oil, walnut oil, grapefruit seed oil, lemon oil, orange oil, gourd oil butternut squash seed oil, egusi seed oil, pumpkin seed oil, watermelon seed oil, açaí oil, black seed oil, blackcurrant seed oil, borage seed oil, evening primrose oil, amaranth oil, apricot oil, apple seed oil, argan oil, babassu oil, ben oil, borneo tallow nut oil, cape chestnut oil, carob pod oil, cocoa butter, cocklebur oil, cohune oil, coriander seed oil, date seed oil, dika oil, false flax oil, hemp oil, kapok seed oil, kenaf seed oil, *lallemantia* oil, mafura oil, manila oil, meadowfoam seed oil, mustard oil, niger seed oil, nutmeg butter, okra seed oil, *papaya* seed oil, *perilla* seed oil, persimmon seed oil, pequi oil, pili nut oil, pomegranate seed oil, poppyseed oil, pracaxi oil, prune kernel oil, *quinoa* oil, ramtil oil, rice bran oil, royle oil, *sacha* inchi oil, sapote oil, *seje* oil, shea butter, taramira oil, tea seed oil, thistle oil, tigernut oil, tobacco seed oil, tomato seed oil and/or wheat germ oil.

24. The method according to claim 14, wherein said oil comprises one or more glyceride, one or more free fatty acid and/or conjugated fatty.

25. The method according to claim 14, wherein grafting in step d) is carried out by dispersing the nanocellulose intermediate in at least one oil and then heating the mixture above 100° C. for at least 30 minutes.

* * * * *